(12) United States Patent
Trummer et al.

(10) Patent No.: US 11,965,613 B2
(45) Date of Patent: Apr. 23, 2024

(54) SYSTEM AND A METHOD FOR PROVIDING A STERILE FLUID CONNECTION BETWEEN A FIRST FLUID CHANNEL AND A SECOND FLUID CHANNEL

(71) Applicant: ZETA GmbH, Lieboch (AT)

(72) Inventors: Erwin Trummer, St. Stefan im Rosental (AT); Georg Pöschl, Graz (AT); Birgit Pittermann, Preding (AT); Reinhard Weingartshofer, Hitzendorf (AT)

(73) Assignee: ZETA GMBH, Lieboch (AT)

( * ) Notice: Subject to any disclaimer, the term of this patent is extended or adjusted under 35 U.S.C. 154(b) by 262 days.

(21) Appl. No.: 17/508,154

(22) Filed: Oct. 22, 2021

(65) Prior Publication Data
US 2022/0128181 A1 Apr. 28, 2022

(30) Foreign Application Priority Data

Oct. 27, 2020 (AT) .............................. A 59026/2020

(51) Int. Cl.
*F16L 23/00* (2006.01)
*F16L 23/032* (2006.01)
*F16L 23/036* (2006.01)

(52) U.S. Cl.
CPC ........... *F16L 23/006* (2013.01); *F16L 23/032* (2013.01); *F16L 23/036* (2013.01)

(58) Field of Classification Search
CPC ..... F16L 23/10; F16L 2201/44; F16L 23/006; F16L 23/032; F16L 23/036
See application file for complete search history.

(56) References Cited

U.S. PATENT DOCUMENTS

| | | | | |
|---|---|---|---|---|
| 2,689,141 A | * | 9/1954 | Kiekhaefer | F16L 23/06 285/410 |
| 2,941,823 A | * | 6/1960 | Good | F16L 23/10 285/410 |
| 3,865,411 A | * | 2/1975 | Rowe | F16L 23/22 285/915 |
| 3,909,910 A | * | 10/1975 | Rowe | F16L 37/1225 D24/129 |

(Continued)

FOREIGN PATENT DOCUMENTS

| | | | | |
|---|---|---|---|---|
| CA | 2961688 A1 | * | 9/2017 | ........ A61M 39/1011 |
| DE | 102013214068 A1 | * | 1/2015 | ............ A61M 39/18 |

(Continued)

*Primary Examiner* — David Colon-Morales
(74) *Attorney, Agent, or Firm* — Merchant & Gould P.C.

(57) ABSTRACT

A system for providing a sterile fluid connection between a first fluid channel and a second fluid channel. The system includes first and second coupling elements located at an orifice of each the first and second fluid channels, respectively. The first and second coupling element each include a foil that may be peeled off their respective orifices. The system additionally includes a connecting element configured to accommodate the first and second coupling elements and to press the orifices of the first and second fluid channels against one another. Additionally, this connecting element has a recess arranged essentially in the plane of the orifices of the fluid channels for passing the foils through the connecting element.

15 Claims, 4 Drawing Sheets

(56) References Cited

U.S. PATENT DOCUMENTS

| | | | | |
|---|---|---|---|---|
| 3,966,240 | A * | 6/1976 | Enomoto | F16L 23/10 285/422 |
| 5,873,611 | A * | 2/1999 | Munley | F16L 23/10 285/410 |
| 5,904,382 | A * | 5/1999 | Bronnert | F16L 23/10 285/365 |
| 6,354,636 | B2 * | 3/2002 | Matsuzawa | F16L 23/08 285/365 |
| 6,655,655 | B1 * | 12/2003 | Matkovich | F16L 47/14 604/905 |
| 6,708,377 | B2 * | 3/2004 | Maunder | F16L 23/10 24/282 |
| 7,350,833 | B2 * | 4/2008 | Bongiorno | F16L 23/04 285/365 |
| 7,578,530 | B2 * | 8/2009 | Eriksson | F16L 23/08 285/411 |
| 7,644,960 | B2 * | 1/2010 | Casey, Sr. | F16L 23/22 285/410 |
| 7,883,121 | B2 * | 2/2011 | Henry | F16L 23/10 285/410 |
| 8,196,971 | B2 * | 6/2012 | Hansen | F16L 23/10 285/410 |
| 8,454,059 | B2 | 6/2013 | Stell | |
| 9,249,909 | B2 * | 2/2016 | Ikushima | F16K 27/02 |
| 9,364,653 | B2 * | 6/2016 | Williams | F16L 37/30 |
| 9,726,308 | B2 * | 8/2017 | Williams | F16L 37/30 |
| 9,770,581 | B2 * | 9/2017 | Gerst | A61M 39/1011 |
| 9,927,052 | B1 * | 3/2018 | Robillard | F16L 23/18 |
| 10,247,342 | B2 * | 4/2019 | Kesselaar | A61M 5/5086 |
| 10,267,443 | B2 * | 4/2019 | Blake | A61M 39/18 |
| 10,408,371 | B2 * | 9/2019 | Floyd | F16L 23/10 |
| 10,449,350 | B2 * | 10/2019 | Gebauer | A61M 39/10 |
| 10,480,694 | B2 * | 11/2019 | Bekkevold | F16L 23/10 |
| 10,653,878 | B2 * | 5/2020 | Löfving | A61M 39/18 |
| 10,962,158 | B2 * | 3/2021 | Scholz | F16L 23/04 |
| 10,966,404 | B2 * | 4/2021 | Balkenhol | F16L 55/105 |
| 11,112,153 | B1 * | 9/2021 | Bergmann | F16L 23/10 |
| 11,141,578 | B2 * | 10/2021 | Shevitz | F16L 23/02 |

FOREIGN PATENT DOCUMENTS

| | | | | |
|---|---|---|---|---|
| EP | | 1375992 | A1 * | 1/2004 ............ F16L 23/04 |
| EP | | 3255331 | A1 * | 12/2017 ........... A61M 39/12 |

* cited by examiner

SYSTEM AND A METHOD FOR PROVIDING A STERILE FLUID CONNECTION BETWEEN A FIRST FLUID CHANNEL AND A SECOND FLUID CHANNEL

CROSS-REFERENCE TO RELATED APPLICATIONS

This application is claims benefit of Austrian Patent Application No. A 50926/2020, filed 27 Oct. 2020, and which application is incorporated herein by reference. To the extent appropriate, a claim of priority is made to the above-disclosed application.

BACKGROUND

The invention relates to a system for providing a sterile fluid connection between a first fluid channel and a second fluid channel.

The invention further relates to a method for providing a sterile fluid connection to a system according to the invention.

In the fields of biopharmacy and the food industry, there have been applied high standards in regard to production, storage and transport of products. Legally binding regulations in these fields regulate, among others, the sterility of production processes, processing processes and applications of the products as well as the performance of product testing. Within the frame of the production, hence, due to the requirements in quality safety and the legally binding regulations it is required to keep products and product ingredients in an as sterile surrounding as possible.

In general, liquid products of the biopharmaceutical field or the food industry during production processes are in large aseptic material containers, in which they are transported, temporarily stored or processed. In the course of the production process, of analyses in laboratories, or simply when relocating such products from one material container into another material container, or from one material container to a processing device or an analysis device, it is necessary to provide fluid connections for the transport of the products. The provision of a fluid connection, however, is always associated with the risk of introducing foreign bodies or germs into the products. A huge challenge in the field of biopharmacy and food industry, hence, is to maintain the sterility of the products when providing fluid connections.

Systems for providing sterile fluid connections according to prior art normally comprise two coupling elements, which are each provided in the region of the orifice of a respective fluid channel. The orifices are additionally closed by a foil that may be peeled off. The foil is in general applied onto the orifice by means of an adhesive, or the foil is press-fit onto the orifice, providing a sterile closure of the fluid channel. The foil may also be in addition closed by welding or sealing. A typical system according to prior art is known from U.S. Pat. No. 8,454,059 B2. In order to achieve a coupling, in this system there are connected two coupling elements, whereby the two orifices of the fluid channels are arranged essentially congruently. This connection is achieved by means of hook elements, which are provided at the coupling elements. Then the foils closing the two orifices are simultaneously peeled off, whereby there is produced the fluid connection. Subsequently, in the U.S. Pat. No. 8,454,059 B2 there is used a safety element or connecting element that may be screwed on in order to secure the fluid connection against mechanic loads.

A disadvantage of prior art is that in the course of the removal of the foils from the orifices there is existent the danger that foreign substances enter the fluid channels and thus contaminate the products flowing through the fluid channels. Known systems further have the disadvantage that these only enable a single-use application and that there is not contemplated a separation of fluid channels once connected. In this way, known systems have a reduced economic viability, contributing to environmental pollution through their single-use application. Furthermore, known systems have restrictions in regard to the maximum pressure load in the connected condition, in which the sterility of the connection produced may be maintained, as well as, for example, the temperature ranges, in which these may be reliably used. In addition, the mechanic stability in the connected condition is limited, which may lead, due to high manipulative forces such as moments occurring because of fixed hoses etc., to leaking in the connection area. The lacking temperature stability is in particular disadvantageous in the in-line use of such systems in the installed condition during sterilization processes using overheated or saturated steam. Also in a dismounted condition, hence, the use in autoclaves is in general not possible.

It is the task of the present invention to provide a system for providing a sterile fluid connection between a first fluid channel and a second fluid channel as well as a method for providing a sterile fluid connection, which prevents the disadvantages mentioned above.

BRIEF SUMMARY

According to the invention the present task is solved by the provision of a system for providing a sterile fluid connection between a first fluid channel and a second fluid channel.

The present task is furthermore solved by the provision of a method for providing a sterile fluid connection.

The system according to the invention for providing a sterile fluid connection between a first fluid channel and a second fluid channel comprises a first coupling element arranged at an orifice of the first fluid channel and a second coupling element arranged at an orifice of the second fluid channel. The first coupling element and the second coupling element each comprise a foil closing the orifice of the respective channel and that may be peeled off of the orifice. According to the invention the system further comprises a connecting element separated from the first coupling element and the second coupling element, which is configured to accommodate the first coupling element and the second coupling element in the region of the orifices of the fluid channels at least in some sections and to press the orifices of the fluid channels, which are closed by the foils, against one another. The connecting element further has a recess arranged essentially in the plane of the orifices of the fluid channels for passing the foils through the connecting element.

The method according to the invention for providing a sterile fluid connection to the system according to the invention comprises the following steps:

Arranging the orifice of the first fluid channel essentially congruently with the orifice of the second fluid channel;

Accommodating at least in some section the first coupling element and the second coupling element in the region of the orifices of the fluid channels by the connecting element;

Passing the foils closing the orifices of the fluid channels and that may be peeled off of the respective orifice through the recess in the connecting element;

Producing the sterile fluid connection by simultaneously peeling off the foils through the recess of the connecting element.

Because of the embodiment according to the invention of the method or of the system, respectively, for providing a sterile fluid connection to a connecting element separated from the first coupling element and the second coupling element as well as the recess provided in the connecting element for passing the foils through the connecting element, there is obtained the advantage that the connecting element may accommodate the first coupling element and the second coupling element in the region of the orifices of the fluid channels, before the foils are peeled off through the recess in the connecting element. In this way, there is achieved a secure connection of the fluid channels as well as a contact pressure between the two orifices or between the two coupling elements, respectively, before the foils are peeled off. In this way, there is effectively prevented that foreign bodies and/or germs enter the fluid connection during the peel-off of the foils, whereby the sterility of the connection is ensured. In addition, the fluid connection is already mechanically stabilized before peeling off the foils, and is also secured against large mechanic loads, whereby the safety of the connection is additionally increased. The recess provided in the connecting element provides a guiding of the foils, whereby there is ensured a uniform and straight peeling off of the foils. The contact pressure in this first coupling is selected such that the foil can be pulled through the recess of the connecting element without tearing. The contact pressure generated by the connecting element is, hence, sufficiently large in this condition in order to ensure the sterility of the connection. By separating the connecting element from the first coupling element and the second coupling element, there is in addition obtained the advantage that the fluid connection may be separated by simply removing the connecting element. Upon cleaning, sterilization and the application of new foils, the system will be ready to be again used. In this way, the economic viability of the system is increased, waste being reduced.

The connecting element of the system according to the invention is preferable configured as a union clamp. This embodiment of the connecting element provides for the advantage that there may be achieved a high biasing force when accommodating the first coupling element and the second coupling element in the region of the orifices of the fluid channels. In this way, the mechanic stability of the fluid connection is increased, with the risk of contamination of the fluid connection by germs when peeling off the foils being reduced.

According to a preferred embodiment of the system according to the invention the first coupling element and the second coupling element have a frustoconical expansion in the region of the orifices. By the frustoconical expansion there is provided a large contact surface, which the connecting element may engage in the course of the accommodation of the coupling elements.

The union clamp is preferably configured to accommodate the frustoconical expansions of the coupling elements at least in some sections, wherein the union clamp has a clamping profile, which applies a clamping load onto the frustoconical expansions when accommodating the coupling elements in the union clamp. In this way, the biasing force generated by the union clamp is further increased. In addition, there is ensured by way of this embodiment that there is applied always the same clamping force, whereby tearing of the foils when peeling off is being prevented.

According to the preferred embodiment of the system according to the invention the union clamp has a bottom part, a top part connected to the bottom part by means of a hinged joint and a clamping element arranged on a side essentially opposite to the hinged joint for locking the top part at the bottom part. Due to this multi-part embodiment of the union clamp having the clamping element for locking, the union clamp may be attached in a simple way and without any large force effort, and also be removed in a simple way. The recess for passing through the foils is preferably provided in the top part of the union clamp. In this way, passing the foils through the connecting element is facilitated.

According to the invention the union clamp may comprise a fixing element connected to the clamping element in an articulated way and a locking element arranged in the region of the hinged joint. The fixing element is configured to span, starting from the clamping element, the top part of the union clamp, and the locking element is configured to lock the fixing element in a position spanning the top part of the union clamp. In this way, there may be obtained a final fixation of the union clamp, which is realized upon peeling off the foils through the recess. In this way, the mechanic stability, the clamping force and the safety of the connection are being further improved. In the condition of this final fixation, there is generated a high contact pressure between the coupling elements, whereby the operation of the connection at a high operational pressure is made possible.

The bottom part preferably abuts, if the first coupling element and the second coupling element are accommodated in the union clamp, only in a central section the first coupling element and the second coupling element. In this way, the biasing force of the union clamp is further increased and may be exactly defined by forming the section 17.

The first coupling element and the second coupling element preferably each have a sealing circumferential to the orifice and covered by the foil. In this way, there is provided an additional barrier against the entry of germs into the fluid connection. The sealings are arranged underneath the foils and in such a way that they provide a secure sealing during as well as after the peel-off of the foils. When peeling off the foil, there is furthermore developed a gap, which is immediately closed by the sealings in order to continuously ensure the sterility of the connection.

According to the preferred embodiment of the system according to the invention the fixing element comprises in the region of the clamping element an eccentric acting on the top part, wherein the eccentric applies a pressure load onto the top part if the fixing element spans the top part of the union clamp. In this way, the force applied onto the first coupling element and the second coupling element by the union clamp and the contact pressure of the coupling elements resulting from this force are additionally enhanced when closing the fixing element.

According to an embodiment variant of the system according to the invention the first coupling element and the second coupling element comprise localization elements that may be coupled to one another, which are configured to position, in the course of a coupling, the orifice of the first fluid channel essentially congruently with the orifice of the second fluid channel. In this way, there is being ensured an optimal positioning of the first coupling element and of the second coupling element.

The foils preferably each comprise a pull-tab folded over at a fringe region of the orifices, which may be passed through the recess of the connecting element. In this way, peeling off the foils is facilitated.

The step of the method according to the invention for passing the foils closing the orifices of the fluid channels, which may be peeled off of the respective foil, through the recess in the connecting element comprises preferably closing the top part of the union clamp, passing the foils closing the orifice of the first fluid channel and of the second fluid channel through the recess in the top part of the union clamp and locking the top part at the bottom part by means of the clamping element.

According to a preferred embodiment of the method according to the invention this, in addition, comprises the following steps:

Spanning the top part of the union clamp with the fixing element;

Locking the fixing element in the position spanning the top part of the union clamp by means of the locking element.

In this way, there is obtained the advantage that the fluid connection produced is secured against inadvertent opening.

BRIEF DESCRIPTION OF THE DRAWINGS

Advantageous embodiments of the system according to the invention and of the method according to the invention as well as alternative embodiment variants are explained in the following by way of the figures in greater detail.

DETAILED DESCRIPTION

Figure 1:
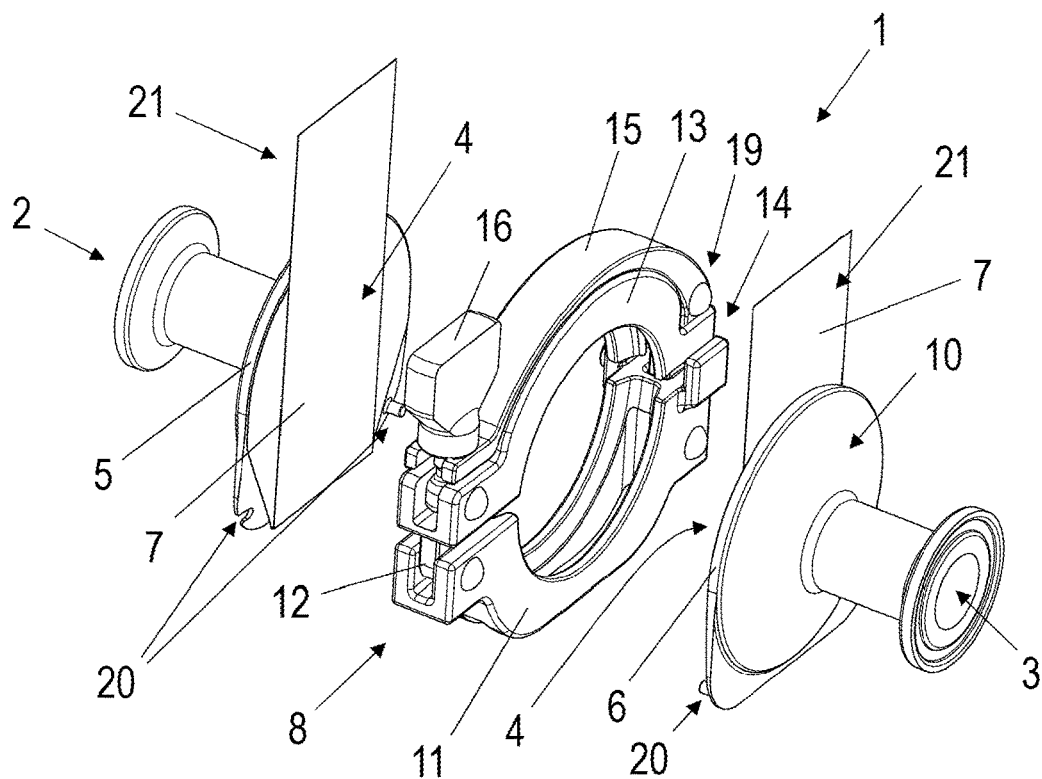
FIG. 1 shows the system according to the invention for providing a sterile fluid connection between a first fluid channel and a second fluid channel in a non-assembled condition.
Figure 2:
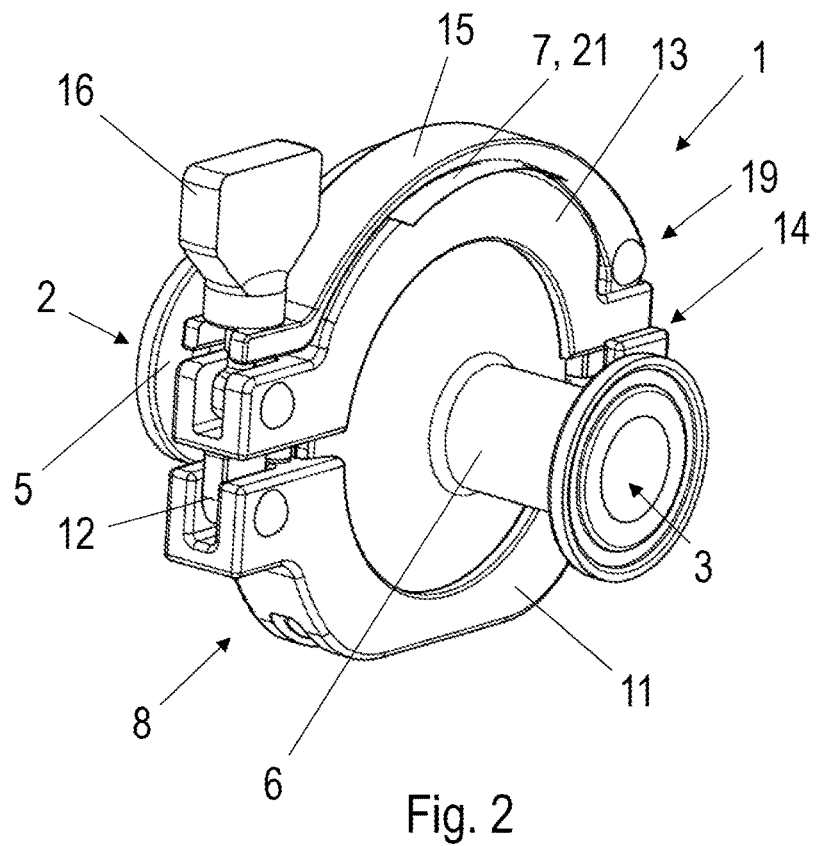
FIG. 2 shows the system according to FIG. 1 in an assembled condition.
Figure 3:
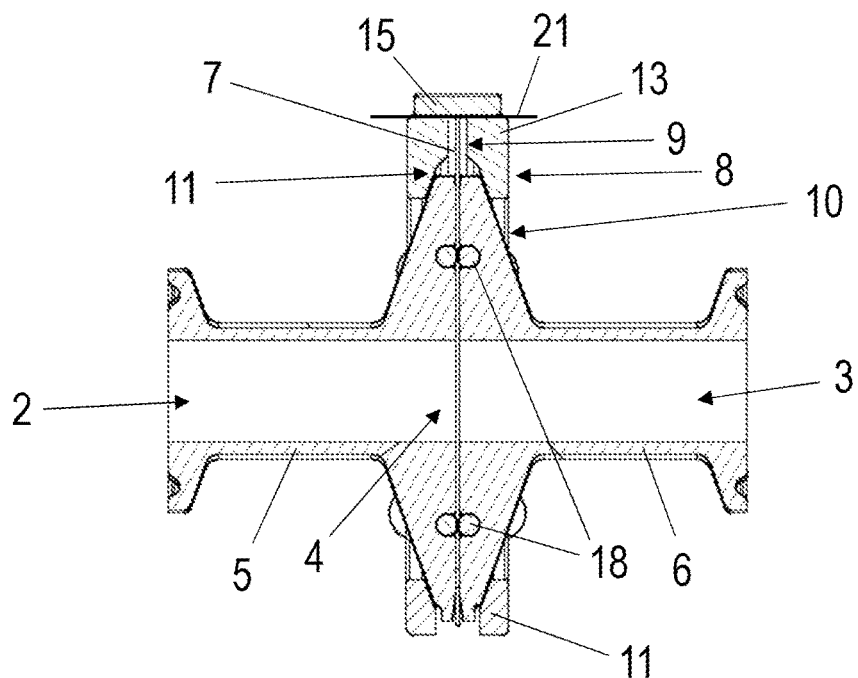
FIG. 3 shows a longitudinal section through the system according to the invention in the assembled condition.

FIG. 1 shows the system 1 according to the invention in a perspective in a non-assembled condition. The system 1 according to the invention for providing a sterile fluid connection between a first fluid channel 2 and a second fluid channel 3 comprises a first coupling element 5 arranged at an orifice 4 of the first fluid channel 2 and a second coupling element 6 arranged at an orifice 4 of the second fluid channel 3. The fluid channels 2 and 3 here extend preferably through the coupling elements 5 and 6. The first coupling element 5 and the second coupling element 6 each comprise a foil 7 closing the orifice 4 of the respective fluid channel 2 and 3, which may be peeled off of the orifice. The system 1 according to the invention is characterized by a connecting element 8 separated from the first coupling element 5 and the second coupling element 6. The separated coupling element 8 is configured to accommodate the first coupling element 5 and the second coupling element 6 in the region of the orifices 4 of the fluid channels 2 and 3 at least in some sections. In the course of the accommodation of the coupling elements 5 and 6 by the connecting element 8, the orifices 4 of the fluid channels 2 and 3, which are closed by the foils 7, are pressed against one another. This configuration of the system 1 according to the invention is visible in FIG. 2 and in FIG. 3, in which the coupling elements 5 and 6 are depicted accommodated in the connecting element 8, whereby the system 1 is present in an assembled condition. According to the invention the connecting element 8 has a recess 9 arranged essentially in the plane of the orifice 4 of the fluid channels 2 and 3 for passing the foils 7 through the connecting element 8. The recess 9 is preferable configured to be slit-like. The recess 9 is visible in FIG. 3, in which the system 1 is depicted in the assembled condition with the connecting element 8 in a longitudinal section, wherein the foils 7 in FIG. 3 are depicted after passing through the recess 9 in a folded-over condition. The recess 9 enables keeping the peel-off angle of the foils 7 always the same.

Using the system 1 according to the invention, there is performed a method according to the invention for providing a sterile fluid connection, which comprises the following steps. Initially, the orifice 4 of the first fluid channel 2 is arranged essentially congruently with the orifice 4 of the second fluid channel 3. Then the first coupling element 5 and the second coupling element 6 are accommodated at least in some regions in the region of the orifices 4 of the fluid channels 2 and 3 by the connecting element 8. Subsequently, the foils 7 closing the orifices 4 of the fluid channels 2 and 3, which may be peeled off of the respective orifice 4, are passed through the recess 9 in the connecting element 8. Then the sterile fluid connection is produced by simultaneously peeling off the foils 7 through the recess 9 of the connecting element 8. In the method step last mentioned for producing the sterile fluid connection the foils 7 are peeled off through the recess 9 in the connecting element 8 from the orifices 4 of the fluid channels 2 and 3.

Due to the inventive embodiment of the method or the system 1, respectively, having the connecting element 8 separated from the first coupling element 5 and the second coupling element 6 as well as the recess 9 provided in the connecting element 8 for passing the foils 7 through the connecting element 8 there is obtained the advantage that the connecting element 8 may accommodate the first coupling element 5 and the second coupling element 6, before the foils 7 are peeled off through the recess 9 in the connecting element 8. In this way, there is ensured that there is available a secure, sterile and mechanically stable connection of the fluid channels 2 and 3 before the foils 7 are removed. This is in particular achieved in that an unsterile side of the foils does not contact the internal side abutting the orifice 4 of the fluid channels 3 and 4, which is sterile or poor in germs, respectively. In this way, there is effectively prevented that foreign bodies and/or germs enter the fluid connection in the course of peeling off the foils 7, whereby the sterility of the fluid connection is being ensured. In addition, the fluid connection is already mechanically stabilized before peeling off the foils 7, and it is also secured against large mechanical loads, whereby the security of the fluid connection is additionally increased. Due to the separated embodiment of the connecting element 8 from the first coupling element 5 and the second coupling element 6 the fluid connection may again be separated by simple removal of the connecting element from the coupling elements 5 and 6. Upon cleaning, sterilization and application of new foils 7, the system 1 is ready to be used again. In this way, the economic viability of the system 1 is increased, with environmental compatibility being improved.

The connecting element 8 and/or the coupling elements 5 and 6 are preferably made from steel. The foils 7 are preferably composite foils made of commercially available, pharmacy-compliant and/or food-grade materials, which are pre-fabricated in a punching machine. In this way, the system 1 according to the invention may be used within a large pressure and temperature range. The system 1 is preferably configured for a pressure range of 0 to 10 bar pressure in the fluid connection. Due to the embodiment according to the invention also the first coupling element 5 and the second coupling element 6 may be connected in use to a hose and may be sanitized. The pre-fabricated foils 7 are preferably applied onto the orifices 4 by means of pressure and/or temperature. Due to the heat, the sealing material will melt on the foil 7 and may be peeled off residue-free after cooling.

As can be seen in the figures, the connecting element 8 is preferably configured as a union clamp. The embodiment as a union clamp enables simple application and removal of the connecting element 8 and provides a high contact pressure of the first coupling element 5 onto the second coupling element 6.

According to the preferred embodiment depicted in the figures of the system 1 according to the invention the first coupling element 5 and the second coupling element 6 preferably have a frustoconical expansion 10 in the region of the orifices 4. This is in particular visible in the cross-sectional view of FIG. 3. Due to the frustoconical expansion 10 there is provided a large contact surface, which the connecting element 8 may engage in the course of accommodating the coupling elements 5 and 6. The union clamp is according to the preferred embodiment configured to accommodate the frustoconical expansions 10 of the coupling elements 5 and 6 at least in some sections. In addition, the union clamp has preferably a clamping profile 11, which applies a clamping load onto the frustoconical expansions 10 when accommodating the coupling elements 5 and 6 in the union clamp. In this way, the biasing force generated by the union clamp is further increased.

Figure 4:
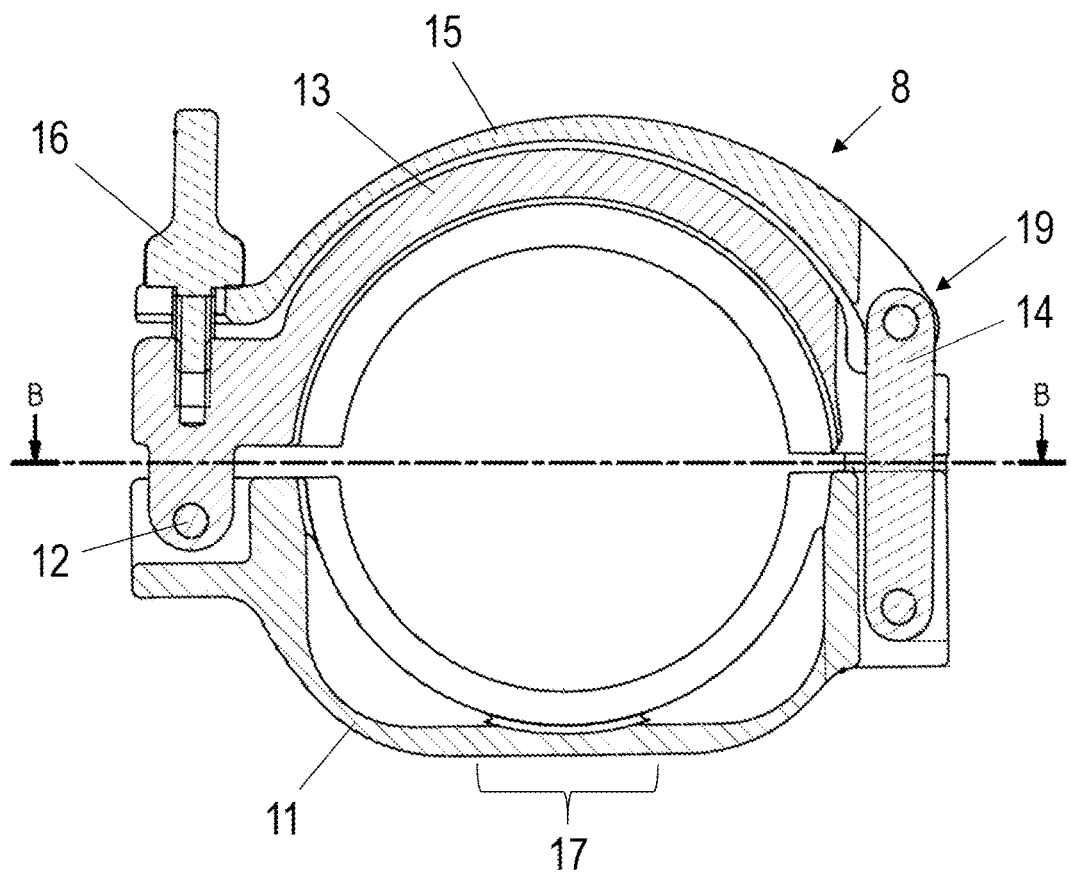
FIG. 4 shows a cross-section through the system according to the invention in the assembled condition.

As can be seen in the cross-sectional view of FIG. 4, the connecting element 8 configured as a union clamp has a bottom part 11, a top part 13 connected to the bottom part 11 by means of a hinged joint 12 and a clamping element 14 arranged on a side essentially opposite to the hinged joint 12 for locking the top part 13 at the bottom part 11. By this multi-part embodiment connected in an articulated way of the union clamp with the clamping element 14 for locking, the union clamp may be attached in a simple way and without any great force effort. In addition, again removal the union clamp is being enabled in a simple way. The recess 9 for passing the foils 7 is preferably provided in the top part 13 of the union clamp, as can be seen in FIG. 3. In this way, passing the foils 7 through the connecting element 8 is facilitated.

According to the preferred embodiment of the system 1 according to the invention the union clamp further has a fixing element 15 connected to the clamping element 14 in an articulated way, which is depicted, among others, in FIG. 4. The union clamp furthermore comprises a locking element 16 in the region of the hinged joint 12, wherein the fixing element 15 is configured to span, starting from the clamping element 14, the top part 13 of the union clamp, and wherein the locking element 16 is configured to lock the fixing element 15 in a position spanning the top part 13 of the union clamp. In this way, there may be obtained a fixing of the union clamp, which may be realized after peeling off the foils 7 through the recess 9. In this way, the mechanical stability, the clamping force and the security of the connection are further improved. Alternatively, fixing may also be realized by means of the fixing element 15 also in an intermediate step before removing the foils 17. Thereby, the fixing element 15 is locked by means of the locking element 16, before the foils 7 are peeled off of the orifices 4. This is visible in FIG. 2 and FIG. 3, wherein the foils 7 are passed through the recess 9 and extend between the top part 13 and the fixing element 15 through into an external region of the union clamp. In order to remove the foils 7 and to produce the fluid connection, there is firstly released the locking by means of the locking element 16, and then the fixing element 15 is pivoted away from the top part 13. Then the foils 7 may be pulled through the recess 9 in the top part 13, without the union clamp having to be completely opened. The locking element 16 is preferably configured as a butterfly screw. Alternative embodiment variants of the locking element are known to those skilled in the art.

Figure 5:
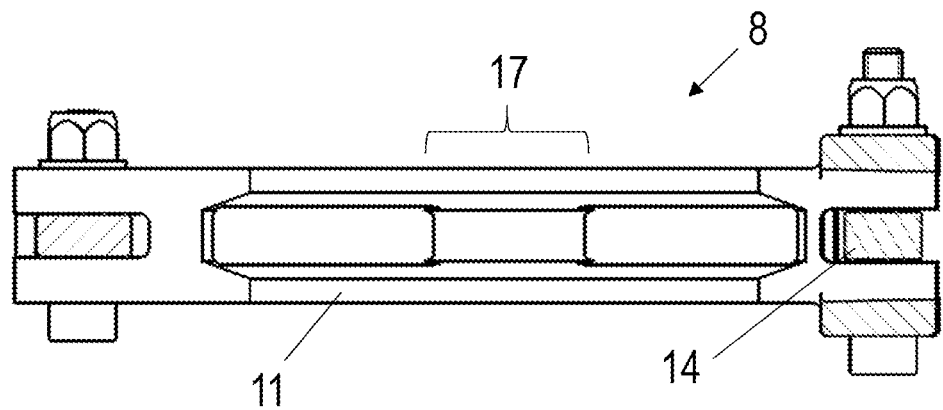
FIG. 5 shows a sectional view through the inventive system according to FIG. 4 along the line B-B.

The bottom part 11 preferably abuts, as visible in FIG. 4, if the first coupling element 5 and the second coupling element 6 are accommodated in the union clamp, only in a central section 17 the first coupling element 5 and the second coupling element 6. The central section 17 is also visible in FIG. 5, which constitutes a sectional view of FIG. 4 along the line B-B. Thereby, the biasing force of the union clamp is further increased. Especially preferably the central section 17 abuts the frustoconical expansions 10 of the coupling elements 5 and 6. Thereby, the contact force is transferred as uniformly as possible as well as reproducibly along the central section 17 to the coupling elements 5 and 6. This provides for the advantage that no additional torque may be transferred onto the coupling elements 5 and 6 in the course of coupling, whereby a tilting of the components of the system according to the invention may be prevented in the course of the production of the connection.

As can be seen in FIG. 3, the first coupling element 5 and the second coupling element 6 according to the preferred embodiment of the system 1 according to the invention each have a sealing 18 circumferential to the orifice 7 and covered by the foil 7. The sealing 18 constitutes an additional barrier against germs entering the fluid channel, in particular when peeling off the foils 7.

To further increase the clamping force of the union clamp, the fixing element 15 according to the preferred embodiment of the system 1 according to the invention further comprises in the region of the clamping element 14 an eccentric 19 acting on the top part, wherein the eccentric 19 applies a pressure load onto the top part 13, if the fixing element 15 spans the top part 13 of the union clamp. The eccentric 19 can, for example, be seen in FIG. 4.

The first coupling element 5 and the second coupling element 6 preferably have localization elements 20, which may be coupled with one another and can be seen in FIG. 1. The localization elements 20 are configured, in the course of coupling, to position the orifice 4 of the first fluid channel 5 essentially congruently with the orifice 4 of the second fluid channel 6. Thereby, there is ensured an optimal positioning of the first coupling element 5 and of the second coupling element 6. The localization elements 20, as depicted in FIG. 1, are preferably configured as grooves and pins, which each engage one another. According to the preferred embodiment variant the first coupling element 5 has a groove and a pin, and the second coupling element 6 also has a groove and a pin, wherein the pin of the first coupling element 5 engages the groove of the second coupling element 6 and the pin of the second coupling element 6 engages the groove of the first coupling element 5. In this way, there is generated a simple, reproducible and releasable possibility of orienting the coupling elements 5 and 6 to one another.

The foils 7 each preferably comprise a pull-tab 21 folded over at a fringe region of the orifices 4, which may be passed through the recess 9 of the connecting element 8. The pull-tab 21 can be seen in FIG. 1, for example. In this way, peeling off the foils 7 of the orifice 4 is facilitated.

The step of passing the foils 7 closing the orifices 4 of the fluid channels 2 and 3 and that may be peeled off of the respective orifice 2 through the recess 9 in the connecting element 8 in the method according to the invention for providing a sterile fluid connection to the system 1 according to the invention comprises according to the preferred embodiment of the method a further step. This step comprises closing the top part 13 of the union clamp, passing the foils 7 closing the orifice 4 of the first fluid channel 2 and the second fluid channel 3 through the recess 9 in the top part 13 of the union clamp and locking the top part 13 at the bottom part 13 by means of the clamping element 14.

The method according to the invention preferably comprises furthermore the steps of spanning the top part 13 of the union clamp with the fixing element 15 and locking the fixing element 15 in the position spanning the top part 13 of the union clamp by means of the locking element 16. In this way, there is obtained the advantage that the produced fluid connection is secured against inadvertent opening.

Figure 6:
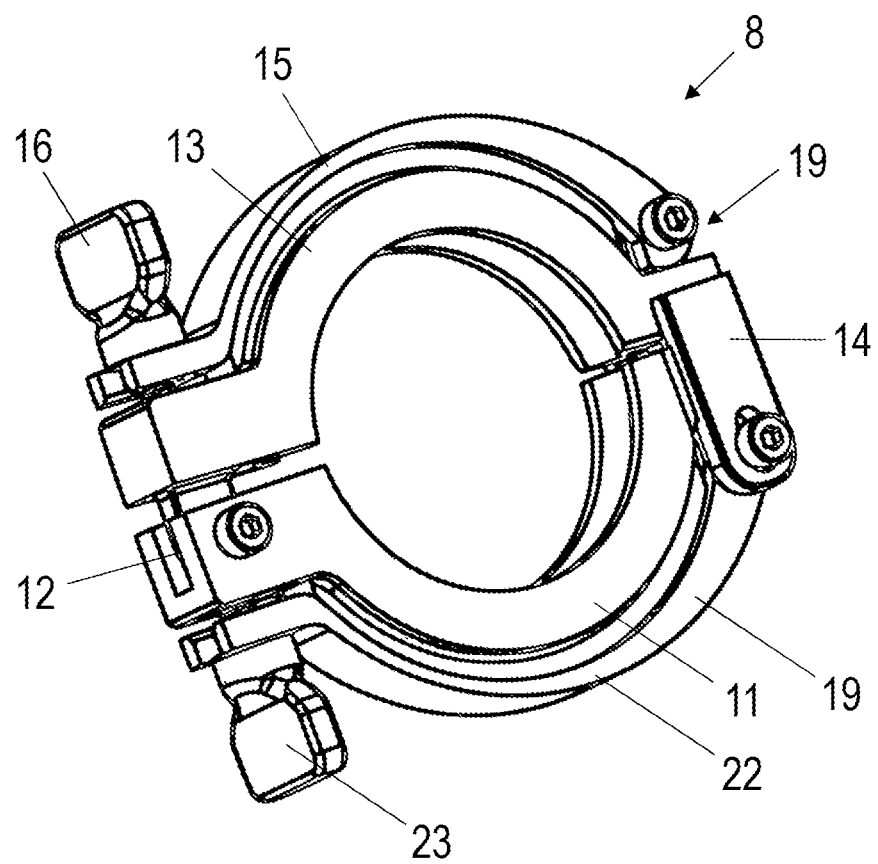
FIG. 6 shows an alternative embodiment variant of a union clamp of the system according to the invention.
Figure 7:
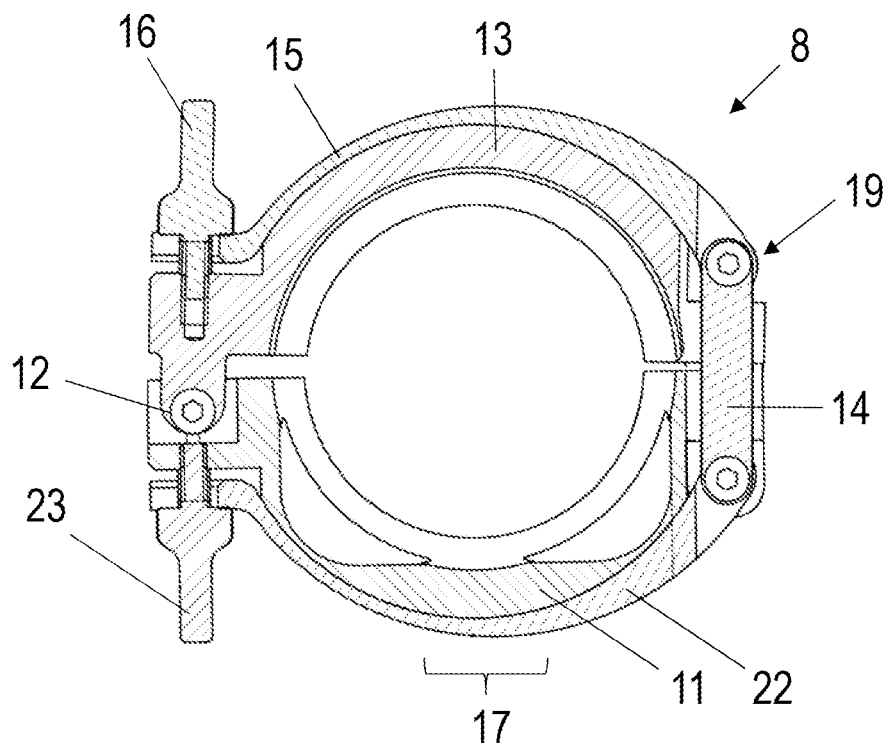
FIG. 7 shows the union clamp form FIG. 6 in a cross-sectional view.

FIG. 6 and FIG. 7 show an alternative embodiment variant of the connecting element 8 of the system 1 according to the invention, which is configured as a union clamp, wherein according to this embodiment variant the union clamp comprises a second fixing element 22 situated opposite to the fixing element 15 and connected to the clamping element 13 in an articulated way. Furthermore, the union clamp comprises a second locking element 23 situated opposite to the locking element 16, wherein the second fixing element 22 is configured, starting from the clamping element 14, to span the bottom part 11 of the union clamp, and the wherein the second locking element 23 is configured to fix the second fixing element 22 in a position spanning the bottom part 11 of the union clamp. Thereby, there is provided additional security against inadvertent opening of the union clamp. The second locking element 23 is preferably embodied as a butterfly screw. Any embodiments alternative to butterfly screws are known to those skilled in the art.

Figure 8:
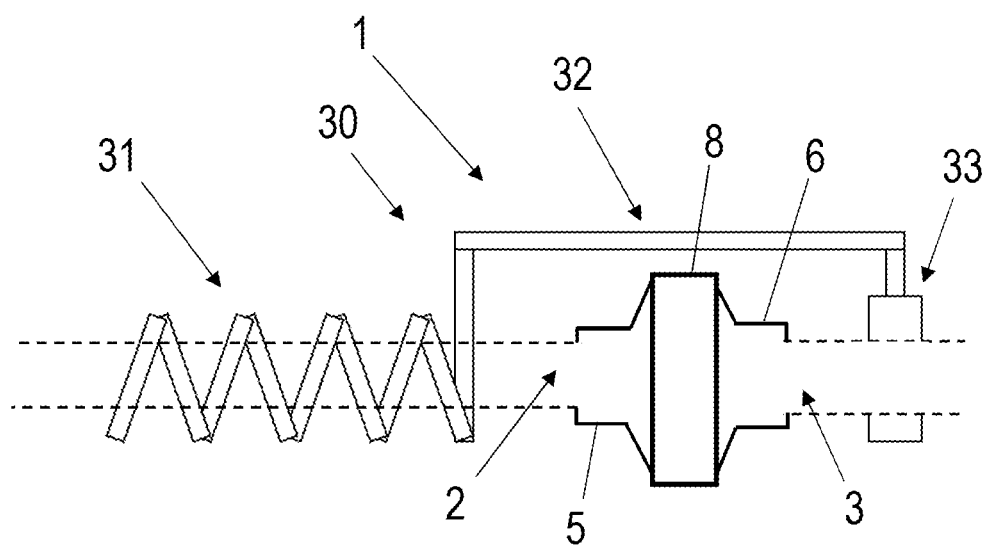
FIG. 8 shows the system according to the invention in a schematic depiction having an additional device for strain relief.

FIG. 8 shows the system 1 according to the invention in an alternative embodiment variant, which comprises an additional device 30 for strain relief. The device 30 comprises a spring 31, a hoop 32 connected to the spring and a clamp 33 connected to the hoop. The spring is configured to accommodate in operation of the device 3 and in the assembled condition of the system 1 the first fluid channel 2 within the spring turns, following the contour of the spring 31. The first coupling element 5, the connecting element 8 and the second coupling element 6 are arranged in operation of the device 30 in the region of the hoop 32. The clamp 33 encompasses or clamps, respectively, in operation the second fluid channel 3. Alternatively, the clamp 33 may also encompass or clamp, respectively, the first fluid channel 2, and the second fluid channel 3 is arranged within the spring 31. Due to the arrangement of one of the fluid channels 2 or 3 within the spring 31 and the rigid connection of the spring 31 via the hoop 32 to the clamp 33, there is obtained a strain relief of the connecting element 8 of the system 1, as the weight of the first fluid channel 2 and of the second fluid channel 3 may be accommodated by the device 30. In this way, the mechanical stability and the compressive strength of the system 1 are improved.

The invention claimed is:

1. A system for providing a sterile fluid connection between a first fluid channel and a second fluid channel, comprising:
a first coupling element arranged at an orifice of the first fluid channel and a second coupling element arranged at an orifice of the second fluid channel, wherein the first coupling element and the second coupling element each comprise a foil that closes the orifice of the respective fluid channel and may be peeled off the orifice; and
a connecting element separated from the first coupling element and the second coupling element, which is configured to accommodate the first coupling element and the second coupling element in the region of the orifices of the fluid channels at least in some sections and to press the orifices of the fluid channels which are closed by the foils against one another, wherein the connecting element has a recess arranged essentially in the plane of the orifices of the fluid channels for passing the foils through the connecting element.

2. The system according to claim 1, wherein the connecting element is configured as a union clamp.

3. The system according to claim 2, wherein the union clamp is configured to accommodate frustoconical expansion of the coupling elements at least in some sections, wherein the union clamp has a clamp profile, which applies a clamping load onto the frustoconical expansions when accommodating the coupling elements in the union clamp.

4. The system of claim 2, wherein the union clamp has a bottom part, a top part connected to the bottom part by a hinged joint for locking the top part at the bottom part.

5. The system according to claim 4, wherein the union clamp comprises a fixing element connected to the clamping element in an articulated way as well as a locking element arranged in the region of the hinged joint, wherein the fixing element is configured to span the top part of the union clamp, starting from the clamping element, and wherein the locking element is configured to lock the fixing element in a position spanning the top part of the union clamp.

6. The system according to claim 5, wherein the fixing element in the region of the clamping element comprises an eccentric acting on the top part, wherein the eccentric applies a pressure load onto the top part if the fixing element spans the top part of the union clamp.

7. The system according to claim 4 wherein the recess for passing through the foils is provide in the top part of the union clamp.

8. The system according to claim 4, wherein the bottom part, if the first coupling element and the second coupling element are accommodated in the union clamp, will abut only in a central section the first coupling element and the second coupling element.

9. The system according to claim 1, wherein the first coupling element and the second coupling element have a frustoconical expansion in the region of the orifices.

10. The system according to claim 1, wherein the first coupling element and the second coupling element each have a sealing circumferential to the orifice and covered by the foil.

11. The system according to claim 1, wherein the first coupling element and the second coupling element comprise localization elements that may be coupled to one another, which are configured to position the orifice of the first fluid channel essentially congruently with the orifice of the second fluid channel in the course of a coupling.

12. The system according to claim 1, wherein the foils each comprise a pull-tab folded over at a fringe region of the orifices, which may be passed through the recess of the connecting element.

13. A method for providing a sterile fluid connection, comprising the steps of:
- arranging an orifice of a first fluid channel essentially congruently with an orifice of a second fluid channel;
- accommodating a first coupling element and the second coupling element in the regions of each orifice of the first fluid channel and the second fluid channel by a connecting element;
- passing a plurality of foils closing each orifice of the first fluid channel and the second fluid channel, which may be peeled off the respective orifice, through a recess in the connecting element; and
- producing the sterile fluid connection by simultaneous peeling off the plurality of foils through the recess of the connecting element.

14. The method for providing a sterile fluid connection according to claim 13, wherein passing the plurality of foils closing each orifice of the first fluid channel and the second fluid channel, which may be peeled off the respective orifice, through the recess in the connecting element, wherein the connecting element is configured as a union clamp, comprises covering a top part of the union clamp, passing the plurality of foils closing the orifice of the first fluid channel and of the second fluid channel through the recess in the top part of the union clamp and locking the top part at the bottom part by the clamping element.

15. The method for providing a sterile fluid connection according to claim 13, wherein following steps:
- spanning a top part of a union clamp with a fixing element;
- locking the fixing element in a position spanning the top part of the union clamp by a locking element.

* * * * *